(12) United States Patent
Probert

(10) Patent No.: US 6,782,478 B1
(45) Date of Patent: Aug. 24, 2004

(54) TECHNIQUES FOR ENCODING INFORMATION IN COMPUTER CODE

(76) Inventor: Thomas Probert, 226 Pond St., Hopkinton, MA (US) 01748

( * ) Notice: Subject to any disclaimer, the term of this patent is extended or adjusted under 35 U.S.C. 154(b) by 0 days.

(21) Appl. No.: 09/301,209

(22) Filed: Apr. 28, 1999

(51) Int. Cl.[7] ............................................... G06F 11/30
(52) U.S. Cl. ..................... 713/191; 713/190; 713/194; 713/200; 713/201
(58) Field of Search ................................ 713/150, 165, 713/166, 167, 187, 189, 190, 191, 194, 200, 201

(56) References Cited

U.S. PATENT DOCUMENTS

| 5,530,752 | A |   | 6/1996 | Rubin |
| 5,649,099 | A | * | 7/1997 | Theimer et al. ............ 709/229 |
| 5,745,569 | A | * | 4/1998 | Moskowitz et al. .......... 380/28 |
| 5,748,741 | A | * | 5/1998 | Johnson et al. ................ 380/28 |

FOREIGN PATENT DOCUMENTS

EP        0 778 520        6/1997
WO        WO 97 04394     2/1997

OTHER PUBLICATIONS

Pozzo et al., "An approach to containing computer viruses," Computers & Security, vol. 6, 1987 (pp. 321–331).
Simmons, Rita C., "Secure Computing Threats and Safeguards," McGraw–Hill Computing Series, 1997.

* cited by examiner

Primary Examiner—Thomas R. Peeso
(74) Attorney, Agent, or Firm—Kevin A. Oliver; Foley Hoag LLP

(57) ABSTRACT

Techniques used in coding software are described. An encoder encodes a machine executable program or portions of a machine executable program. The encoding process uses a cipher table, a unique key for encoding, and an agreement between the encoder and decoder as to what portions of a machine executable will be encoded. By using the decoder on a computer system which may execute the encoded machine executable, the decoder may serve as a recognizer to only execute those machine executable programs which have been encoded and are recognized by the recognizer. If a machine executable is not recognized or rejected, appropriate actions may be taken other than the machine executable.

25 Claims, 13 Drawing Sheets

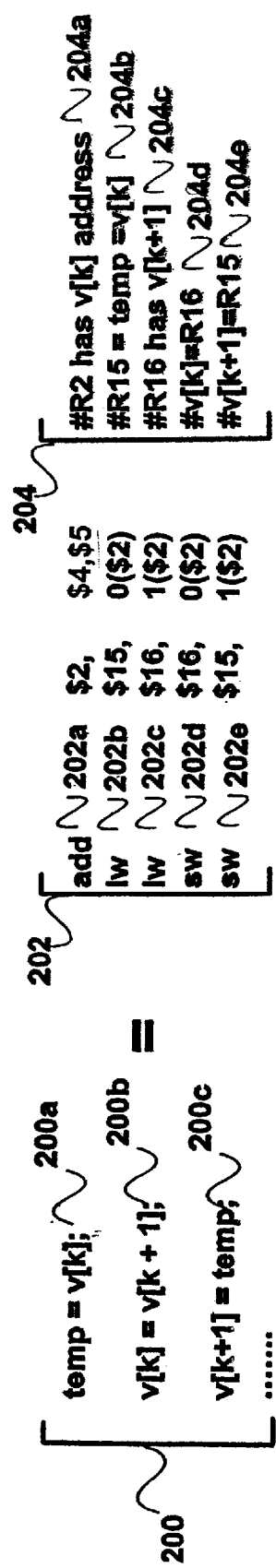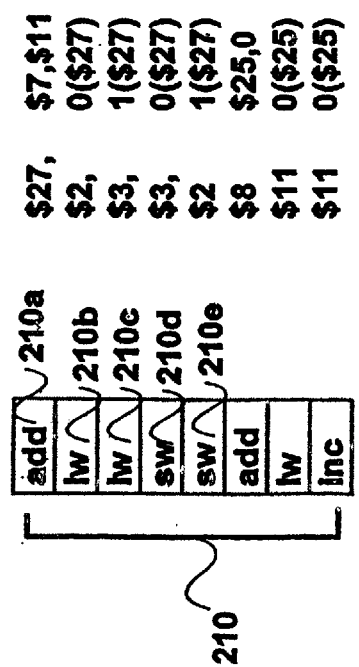
Figure 12a
Figure 12b

US 6,782,478 B1

TECHNIQUES FOR ENCODING INFORMATION IN COMPUTER CODE

BACKGROUND OF THE INVENTION

This invention generally relates to computer programs that are executed in computer systems, and more specifically to techniques for encoding information in computer programs that are executed in computer systems.

Generally, a computer or software virus is a special piece of software code existing within other software. The computer virus may perform actions, for example, producing harmful results to existing information systems that include the software having the computer virus. Generally, computer viruses are recognized today as a serious threat to the integrity of an information processing system due to the devastating effects a computer virus may have, for example, such as interfering with system operations or the destruction of valuable data.

As a result, techniques have been developed for protecting information processing systems from computer viruses. These techniques include both the detection and the removal of computer viruses. Most current techniques for detecting computer viruses do so only after computer code which includes a computer virus has been loaded into an information system and is executed. Thus, existing virus technology requires that an information system be exposed and contaminated prior to being able to detect a computer virus.

Code may be reused in that a section of common code may appear in multiple computer programs. Programming trends such as this make it easier for a computer virus to infect multiple pieces of code since newly developed software, by reusing existing code, often has a similar structure to prior code. Thus, an existing virus may use the same technique to infest itself in new computer software through the same paths that it infected prior software.

A particular computer virus may also mutate. By mutating, a computer virus slightly modifies itself, quite similar to the concept of a biological virus mutation. Generally, by having mutated viruses, several different versions of the same computer virus exist. This poses a problem for existing computer virus techniques for detecting a virus in that the numerous versions of the same computer virus must be detectable. This is one area where existing computer virus detection techniques may fail if they are only able to detect known viruses. Therefore, as a computer virus mutates and produces several versions of itself, a version of an anti-virus software may be unable to detect the different mutated viruses.

Thus, there is required a technique for computer virus detection which does not require an information processing system to be contaminated prior to detection, and provides for increased computer system security as in information processing systems.

SUMMARY OF THE INVENTION

In accordance with principles of the invention, a method executed in a computer system for encoding machine executable programs includes generating a machine executable program. A unique key is used to encode the machine executable program. A cipher table is produced in accordance with elements of the unique key and the machine executable program. Portions of the machine executable program to be encoded are determined. These portions of the machine executable program are encoded. The encoded machine executable program is decoded prior to execution.

In accordance with another aspect of the invention, disclosed is an apparatus for encoding machine executable programs. The apparatus includes machine instructions for choosing a unique key to encode the machine executable program. Machine instructions produce a cipher table in accordance with elements of the unique key and the machine executable program. Machine instructions determine portions of the machine executable program to be encoded, and machine instructions also encode the machine executable program are encoded. Machine instructions included in the apparatus also decode the machine executable program prior to execution.

Thus, there is provided a technique for computer virus detection which does not require an information processing system to be contaminated prior to detection, and provides for increased computer system security as in information processing systems.

Encoding information into the structure of a computer program constitutes a covert channel of communication between a source of communication and an execution platform. It is a general technique used to enable the execution platform to determine whether machine executable code is intended for execution on the execution platform. This technique is a form of recognition of "selfness" similar to a biological immune system.

Using the techniques described herein, code is recognized as either intended for execution on the execution platform ("self"), or not intended for execution on the execution platform ("non-self"). This is a binary condition such that code "failing" the recognition test is recognized as "non-self". Generally, this recognition of selfness is not dependent upon purpose of the code. The foregoing are important in comparing previous techniques to the covert channel approach since prior art approaches are generally designed when considering the purpose of the code.

Existing virus detection techniques detect known code sequences based on previous exposure. Also, suspect behavior is detected based on, for example, unusual memory reference patterns, instruction execution sequences, and I/O accesses. Using the foregoing prior art techniques, one needs to know about code sequences, or how "suspect" code and other code each execute for comparison purposes to enable detection. The techniques of the invention do not require such prior exposure or prior information as in the previously described prior art techniques.

Another approach to preventing inappropriate execution of code is to verify that the code has not been modified since construction by a "trusted source", as by checking construction with an electronic signature technique. Examples include use of checksums, and Tripwire which is a hash coded signature generated from a source file that may be used to check whether a file has been modified, as described in "Secure Computing: Threats and Safeguards", McGraw-Hill Computing Series, 1997, by Rita C. Simmons. However, techniques such as Tripwire, verify a source. This prior art technique is unable to detect, for example, self modifying code viruses. Using techniques of the invention, self modifying code viruses may also be detected, for example, without requiring knowledge of variations of a virus. The techniques of the invention also prevent viruses from constructing copies of itself, and from propagating itself and copies of itself.

Existing approaches use the previously described techniques, firewalls, and the like to prevent propagation. Employing self recognition techniques of the invention do not require these other mechanisms.

BRIEF DESCRIPTION OF THE DRAWINGS

The above-mentioned and other features of the invention will now become apparent by reference to the following description taken in connection with the accompanying drawings, in which:

FIG. 12a depicts an example code segment before processing of encoding; and

FIG. 12b depicts the code of FIG. 12a after processing and encoding.

DESCRIPTION OF THE PREFERRED EMBODIMENTS

Figure 1:
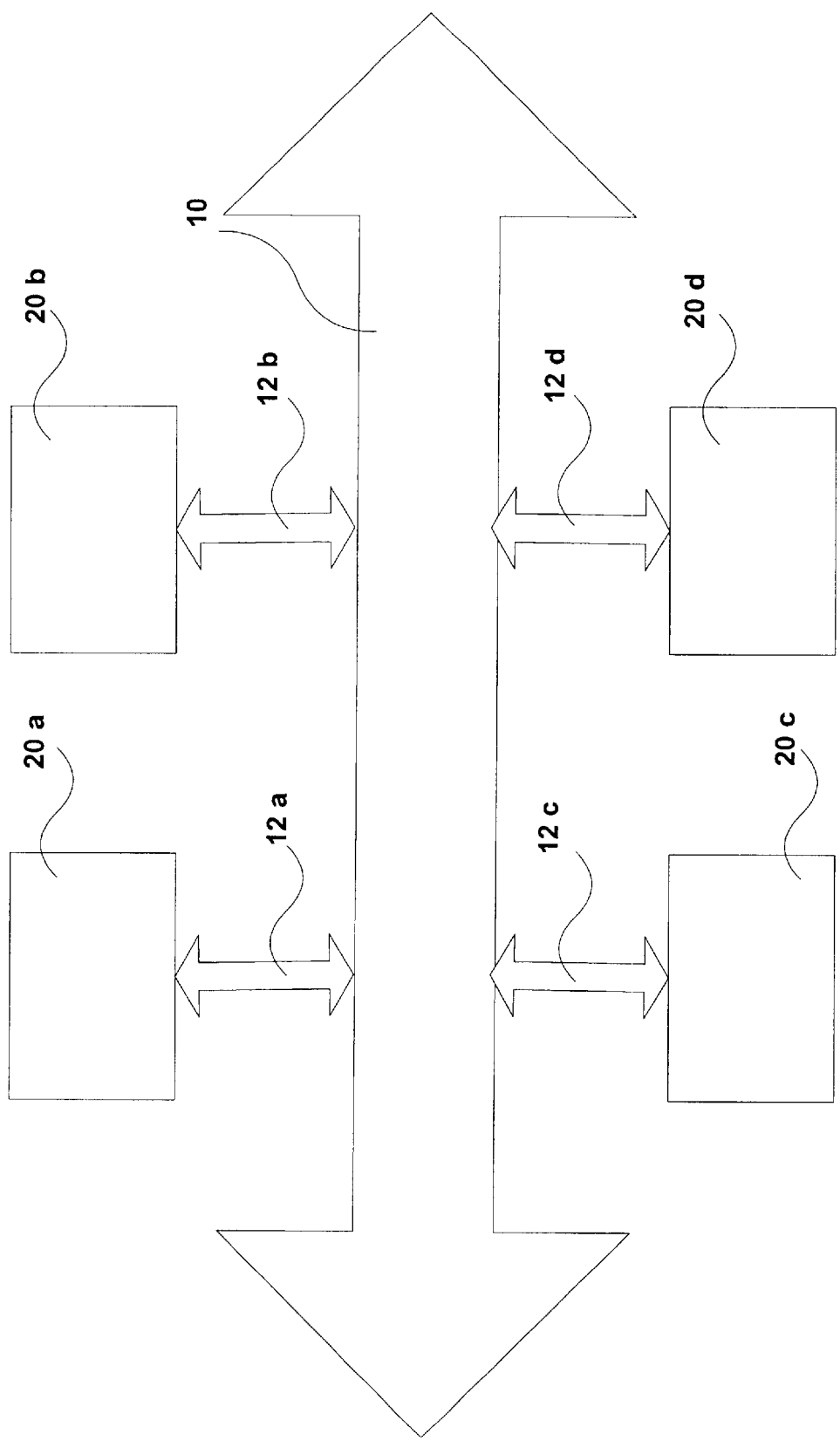
FIG. 1 is a block diagram of a computer system embodying the invention.

Referring now to FIG. 1, shown is an embodiment of a computer system 14. The computer system 14 is shown to include a plurality of computer processors or nodes (20a–20d); connected to a network 10 by network interface connections 12a–12d, respectively. Generally, nodes, such as 20a and 20b, may communicate using the network 10 over network connections 12a and 12b, respectively. Nodes 20c and 20d similarly can communicate with other nodes in the network using the network 10 through their network interface connections 12c and 12d, respectively.

It should be noted that the hardware of the various nodes and network that may be included in an embodiment of FIG. 1 may vary with application and use. A conventional computer system, as well as a special manufactured computer system for a particular application, may be used in a preferred embodiment of the invention. Similarly, as will be described in paragraphs that follow, an embodiment may include any type of network 10 required for a particular application. A preferred embodiment of the invention may include no network but may also reside on a standalone computer system with software loaded into the system via a storage medium and device, such as a CD-ROM or disk drive.

Figure 2:
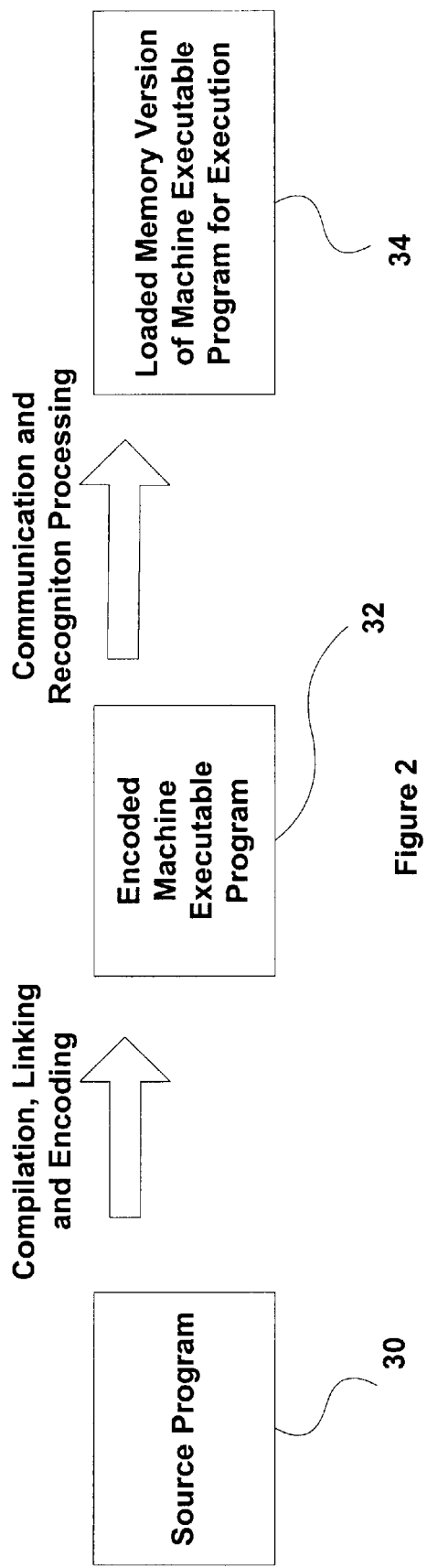
FIG. 2 depicts an embodiment of a technique for detecting program validity prior to executing a recognized machine executable program.

Referring now to FIG. 2, shown is one embodiment of the general process of detecting program validity prior to executing a recognized machine executable program. A source program 30 is first compiled, linked and encoded to produce an encoded machine executable program 32. The source program and the encodable machine executable program may reside, for example, on one of the nodes in the computer system 14, such as node 20a. The process of compiling, linking and encoding the source program 30 to produce an encoded machine executable program 32 is also a process that may be performed by the processor on node 20a of the computer system 14. Communication and recognition processing of the encoded machine executable program 32 occurs. Generally, a loaded memory version of the machine executable program is ready for execution once it has been determined that the encoded machine executable program is a valid program and is properly recognized. Also, generally, a determination may be made as to which computer processing node the encoded machine executable program is to be executed upon. In one embodiment, the source program 30 and the encoded machine executable program 32 are located on system 20a in the computer system 14. The encoded machine executable program is to be executed, as by a user, in the computer system 20b also of the computer system 14. A communication may be made between computer system 20a and 20b, as through the network 10, to transfer the encoded machine executable program 32 from node 20a to node 20b. On node 20b, the recognition processing may occur, and the encoded machine executable program may be subsequently loaded into computer system 20b for execution once recognition and verification has been successful.

As known to those skilled in the art, loading a machine executable program is generally a step performed prior to execution in which the machine executable program is loaded into dynamic memory, for example, of a computer system. Various tasks may be performed by operating system software generally known as a loader responsible for preparing a machine executable program for execution. One such task may include loading the machine executable program into memory such as, for example, by performing relocation of various code and data segments, and accordingly updating any references.

It should be noted that the foregoing processing steps of FIG. 2, as well as the different source programs and machine executables, may be included in one node of the computer system rather than on multiple nodes in the computer system, as in the embodiment described above. For example, the source program and the encoded machine executable program may be included in node 20a. Additionally, node 20a may be the node upon which the machine executable program 32 is to be executed. In this instance, there is no internode communication, as between nodes 20a and 20b. Rather, the encoded machine executable program 32 is loaded into the memory of computer system 20a for execution once the recognition processing is successfully completed on node 20a.

Figure 3:
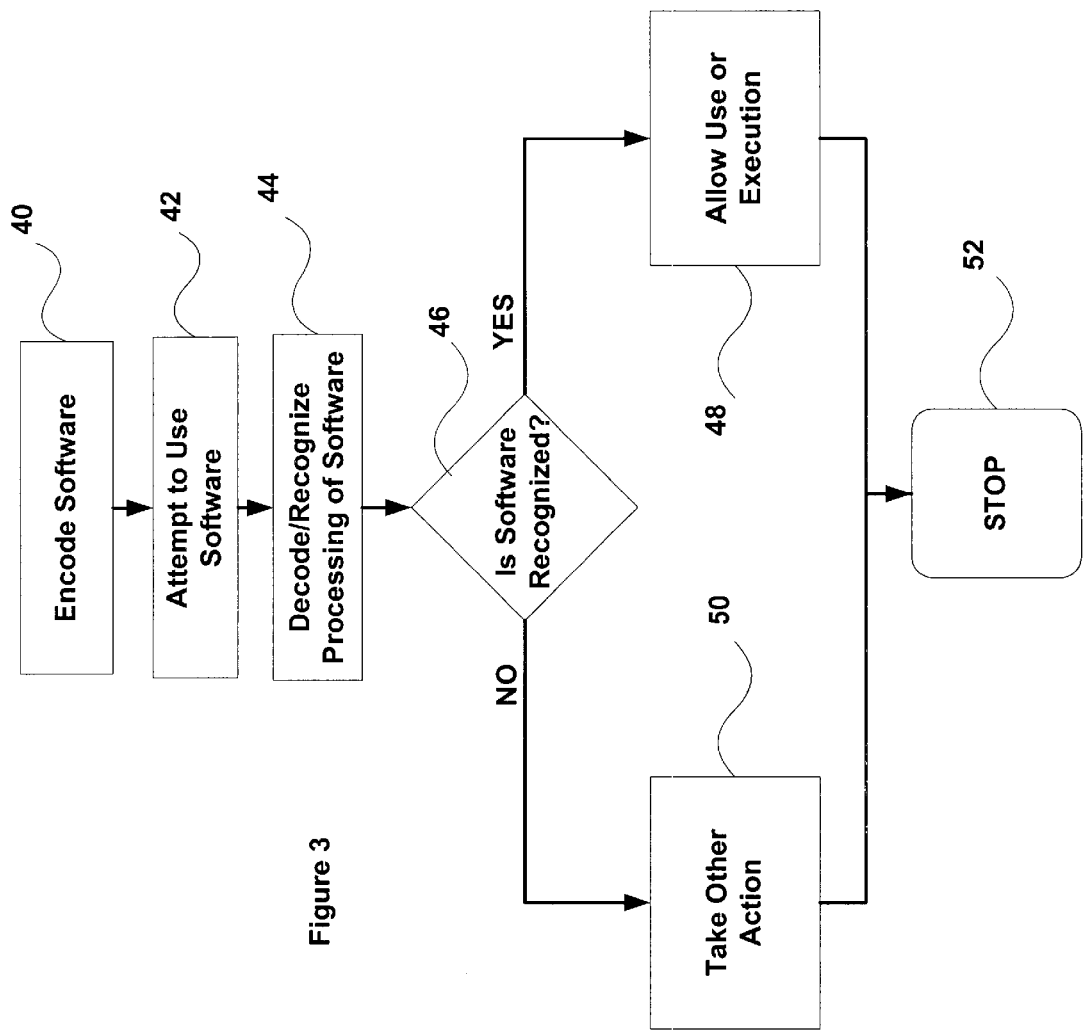
FIG. 3 is a flowchart showing an embodiment of a method with steps for accepting or rejecting a machine executable program.

Referring now to FIG. 3, shown is a flowchart of an embodiment of a method for accepting or rejecting a machine executable program. In other words, the method steps of FIG. 3 depict general processing steps as may be performed in the recognition of an encoded machine executable program. At step 40, the software is encoded. Generally, step 40 produces an encoded machine executable program, similar to element 32 of FIG. 2 previously described. At step 42, an attempt may be made to use the software produced by step 40. Generally, the encoded machine executable program as produced by step 40 may be invoked, as by a user wishing to execute a particular program. At step 44, the process of decoding or recognizing the software to be executed is performed. At step 46, a determination is made as to whether the software is recognized as valid. If a determination is made at step 46 that the software is recognized as valid, control proceeds to step 48 where the use or execution of the software is allowed. This results, for example, in the loaded memory version of the machine executable program for execution as previously described in conjunction with element 34 of FIG. 2. If a determination is made at step 46 that the software is not recognized as valid, control proceeds to step 50. At step 50, other actions may be taken as an alternative to allowing the execution or use of the encoded machine executable program. At this point in processing at step 50, the software is not recognized or validated. Generally, if the software is not recognized and control proceeds to step 50, it may indicate, for example, a virus in a machine executable program. Other uses of the foregoing method steps and other techniques will be described in paragraphs that follow. It should also be noted that at step 50, a determination may also be made to also allow the use or execution of the program even though the software is not recognized. After the execution of steps 48 or 50 depending on the determination made at step 46, control proceeds to step 52 where the processing of accepting or rejecting encoded machine software stops.

Figure 4:
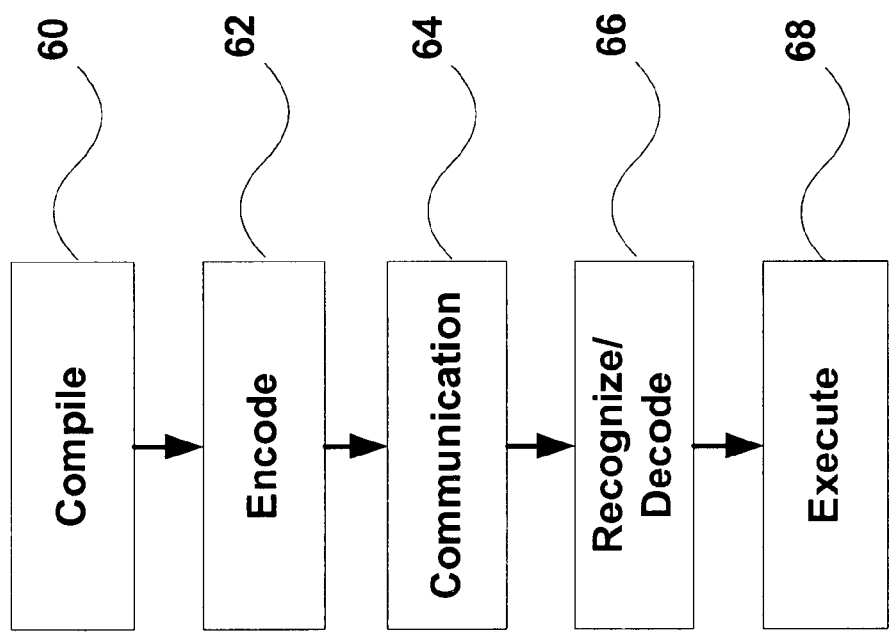
FIG. 4 is a flowchart of an embodiment of a method of steps for recognizing a program.

Referring now to FIG. 4, shown are the method steps of one embodiment for recognition of an encoded machine executable program. Generally, these method steps are more detailed than those described in FIG. 3. The embodiment of FIG. 4 generally further combines the process of compilation in conjunction with FIG. 2 processing.

At step 60, a source program, such as source program 30, is compiled. After the compilation process, the resulting machine executable program is encoded as in step 62. It should be noted that the encoding process may also be considered part of the compiler and the compilation process itself rather than as a separate and distinct step as depicted in FIG. 4. However, whether the encoding process is considered as part of the compiler or as an additional functional component, one point to note is that the encoding process occurs upon the object code or machine executable code output from the compiler. At step 64, a communication may be made to the node upon which the encoded machine executable program is to be executed. It should be noted that if the encoded machine executable program is to be executed upon the same node and not transferred to another node for execution, step 64 may not be needed. At step 66, recognition or decoding of the machine executable program as produced by step 62 is performed. At step 68, the decoded machine executable program may be executed if it is recognized as valid.

Figure 5:
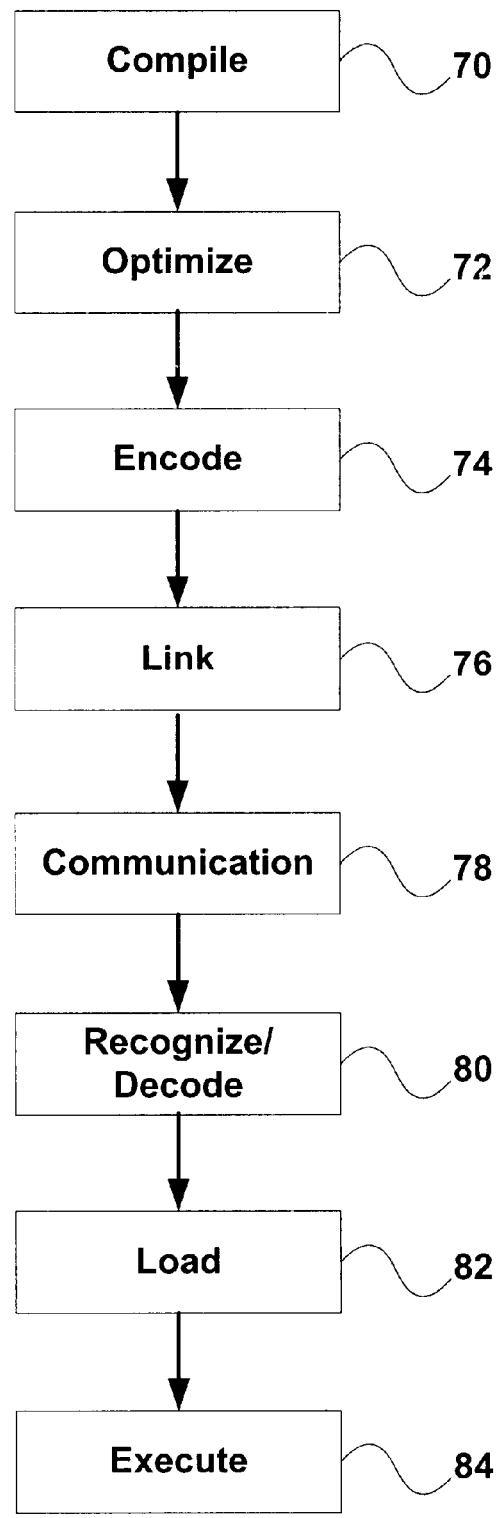
FIG. 5 is a flowchart showing a second embodiment of a method for recognizing a program.

Referring now to FIG. 5, shown is a flowchart of an embodiment of method steps for recognizing a program. Generally, the steps represented in FIG. 5 are more detailed steps than those depicted in FIG. 4. At step 70, a source program is compiled. As part of the compilation process, optimization may be performed, as in step 72, upon a source program to produce a machine executable program. At step 74, the machine executable program produced as a result of the optimization step 62 is encoded. At step 76, the encoded machine executable program is linked, as with a linker, producing a final version of a machine executable program. At step 78, this encoded machine executable program may be transferred to the node upon which it is to be executed. At step 80, a recognizer or a decoding process is performed, for example, in a node upon which the encoded machine executable program is to be executed. At step 82, the decoded machine executable program is loaded into memory of a processor upon which the machine executable program is to be executed. At step 84, the decoded machine executable program is executed.

In one embodiment, step 73–76 are executed upon one node in the computer system 14, such as node 20*a*. Communication is performed, as in step 78, to transfer the encoded machine executable program to a second node in the computer system 14, such as node 20*b*. Steps 80–84 may be performed on node 20*b*. In another embodiment, steps 70–84 may be performed upon one node in the computer system, such as node 20*a*. Thus the actual communication, as performed at step 78, may not occur between two nodes in the computer system 14, but rather may involve only communications within the node 20*a* and not communications between multiple nodes in the computer system. In yet another embodiment, steps 70–76 may be performed upon one node in the computer system such as node 20*a*. The decoding step may be performed upon a second node in the computer system such as node 20*b*. The machine executable program may be executed upon a third node in the computer system such as node 20*c* in the computer system. Thus steps 82 and 84 in this embodiment may be performed upon node 20*c*. Generally, it should be noted that the steps in FIG. 5 may be performed on any combination of nodes in the computer system 14 as known to those skilled in the art, provided that there are secure contact points when performing the various method steps of FIG. 5. This will be described in more detail in paragraphs that follow.

It should also be noted, that steps 70–74 of FIG. 5 may generally be referred to as functions performed by a compiler. However, FIG. 5 depicts a process of compilation as being separate from optimization and the encoding, although one skilled in the art may also consider them as part of the actual compiler.

Figure 6:
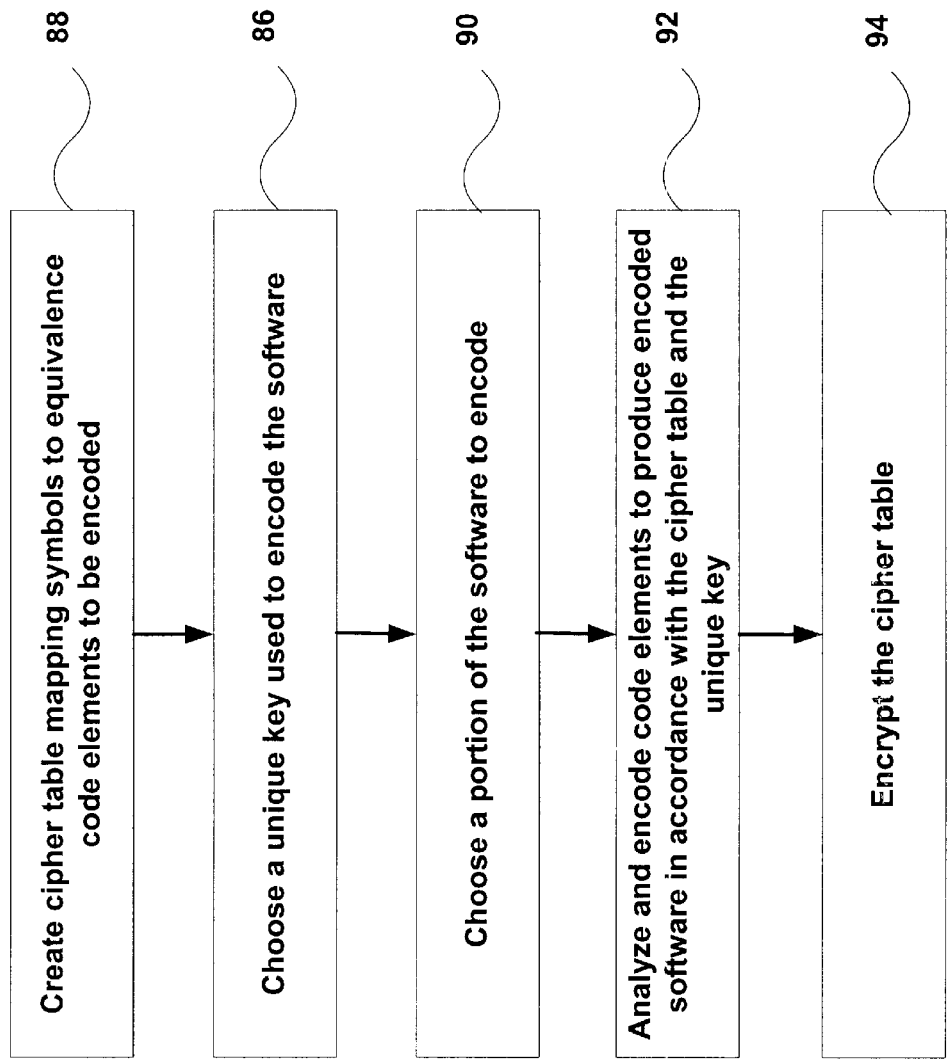
FIG. 6 is a flowchart of an embodiment of a method of steps generally performed for encoding a machine executable program.

Referring now to FIG. 6, shown is a flowchart depicting an embodiment of a technique for performing the encoding process of a machine executable program. At step 86, a unique key is used to encode the software. Generally, the unique key includes multiple symbols which will be used in encoding the software. At step 88, a cipher table is created which maps the symbols that appear in the unique key to equivalent code elements to be encoded in the machine executable software. In other words, the cipher table provides a mapping by which symbolic substitution is done of code elements in the machine executable program in accordance with the encoding specified by the unique key. This will become more apparent in paragraphs that follow.

At step 90, a portion of the software is chosen to be encoded. In other words, the entire machine executable program does not have to be the subject of the encoding process. Rather, a particular portion of the software may be encoded. In one embodiment that will be described, for example, assignment statements may be chosen as that portion of the software to be encoded. At step 92, a machine executable program is analyzed and the various code elements are encoded in the machine executable program to produce the encoded software in accordance with the cipher table and the unique key. In other words, at step 92, the unique key is used to index into the cipher table to provide a code element which is encoded in the software.

At step 94, the cipher table may be encrypted using any one of a variety of encryption techniques currently known to those skilled in the art. For example, a common technique used for data encryption is a public/private key encryption. In this instance, the cipher table would be encoded with a sender's private key. A recipient of the cipher table would be able to decrypt the cipher table using the sender's public key. This is just one of a variety of techniques by which the cipher table may be encrypted as in step 94.

It should generally be noted that several items included in the processing steps of FIG. 6 may be used to create a "signature". The signature is generally unique between the sender and the recipient of the encoded machine executable program. The signature may include, for example, the cipher table, the unique key, the determination of the portion of the software to be encoded, and the method of encrypting the cipher table. It should be noted that the unique key used in step 86 may be any unique key as long as both the encoder and decoder are aware of the unique key being used. Similarly, the actual software portions chosen to be encoded in step 90 may be any of those portions of the software as long as the sender and the recipient of the encoded machine executable program both know and agree to encode and decode the same portions to ensure proper recognition and verification of a machine executable program.

Figure 7:
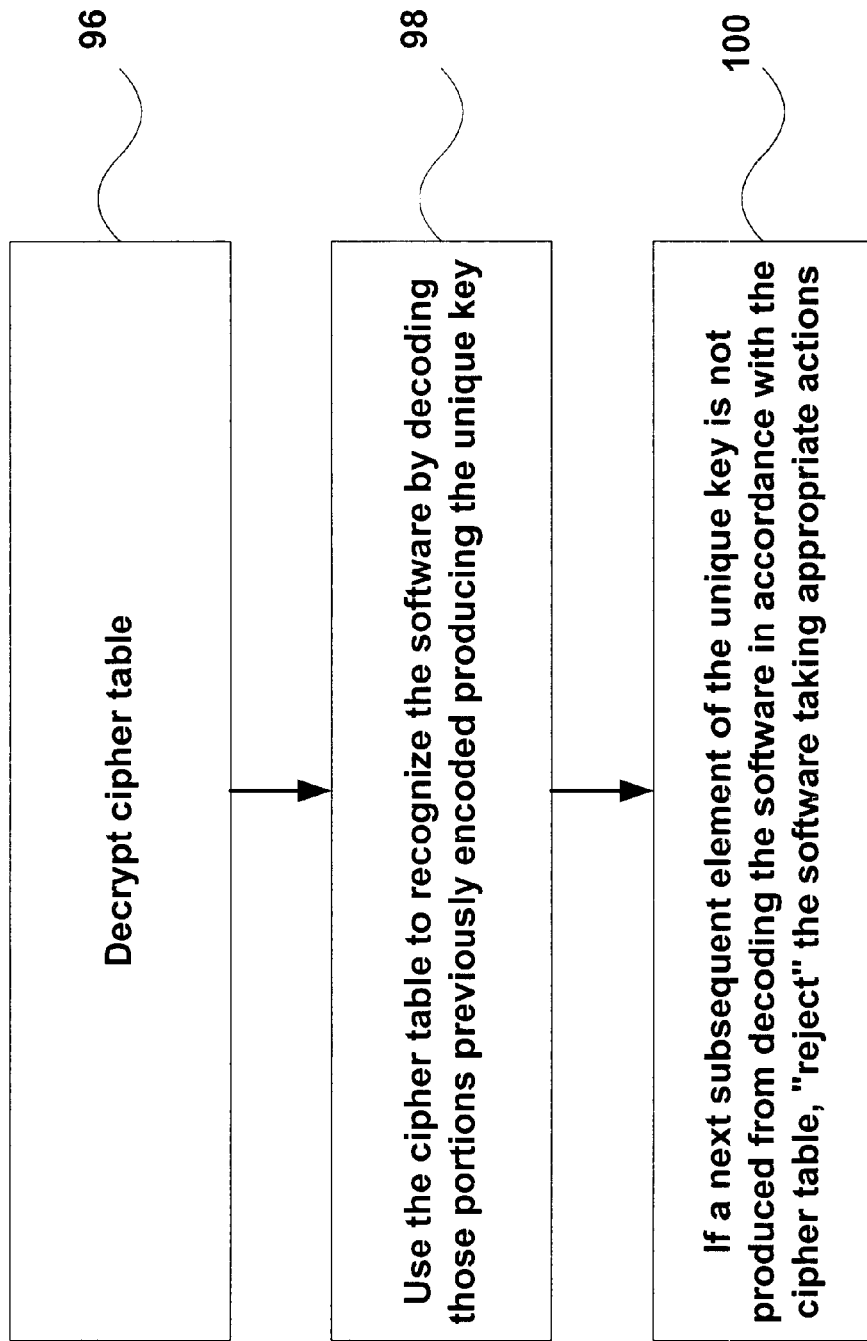
FIG. 7 is a flowchart of an embodiment of a method of steps for decoding a machine executable program.

Referring now to FIG. 7, shown is a flowchart of an embodiment of a technique with method steps for decoding a machine executable program. In step 96, the cipher table is decrypted. In addition to sending the encoded machine executable program between the sending node and the receiving node, the cipher table may also be transferred. Generally, the cipher table may be included as part of a message or other data transfer between a sending node, which encrypted the machine executable software, and a receiving node upon which the machine executable program may be executed. Depending upon the agreed upon technique for encrypting the cipher table, a recipient may decrypt the cipher table using the appropriate decrypting techniques. In the previously described embodiment, the cipher table may be encrypted using a public/private key encryption technique. Subsequently, the recipient of an encrypted cipher table may acquire the appropriate public key corresponding to the sender, and use this to decrypt the cipher table.

At step 98, the cipher table may be used to recognize the software by decoding those portions previously encoded and producing the unique key. Generally, the decoding process in step 98 has knowledge about the particular portions previously encoded as in step 90 of FIG. 6. Using the cipher table decrypted at step 96, and the knowledge of which portions were encoded in step 90, the decoding process may be used to produce the unique key chosen in step 86 as used to encode the machine executable program. Details of this processing are described in paragraphs that follow in conjunction with the decoder figures. If in the process of decoding the software in step 98 an element being examined by the decoder, as included in the encoded software, does not produce an expected subsequent element of the unique key in accordance with the cipher table, the software may be "rejected". In other words, as at step 100, each encoded element is decoded and produces an element of the unique key. Upon examination of an encoded element of the machine executable program and the cipher table, if the element produced by the decoding process is not the next expected element included in the unique key, then the machine executable program has not been recognized and verified as proper. In other words, the software may have been contaminated by a virus, may not be the appropriate version expected from a particular user, or may not be valid in accordance with other techniques and uses of the signature associated with a particular encoded machine executable program.

Figure 8:
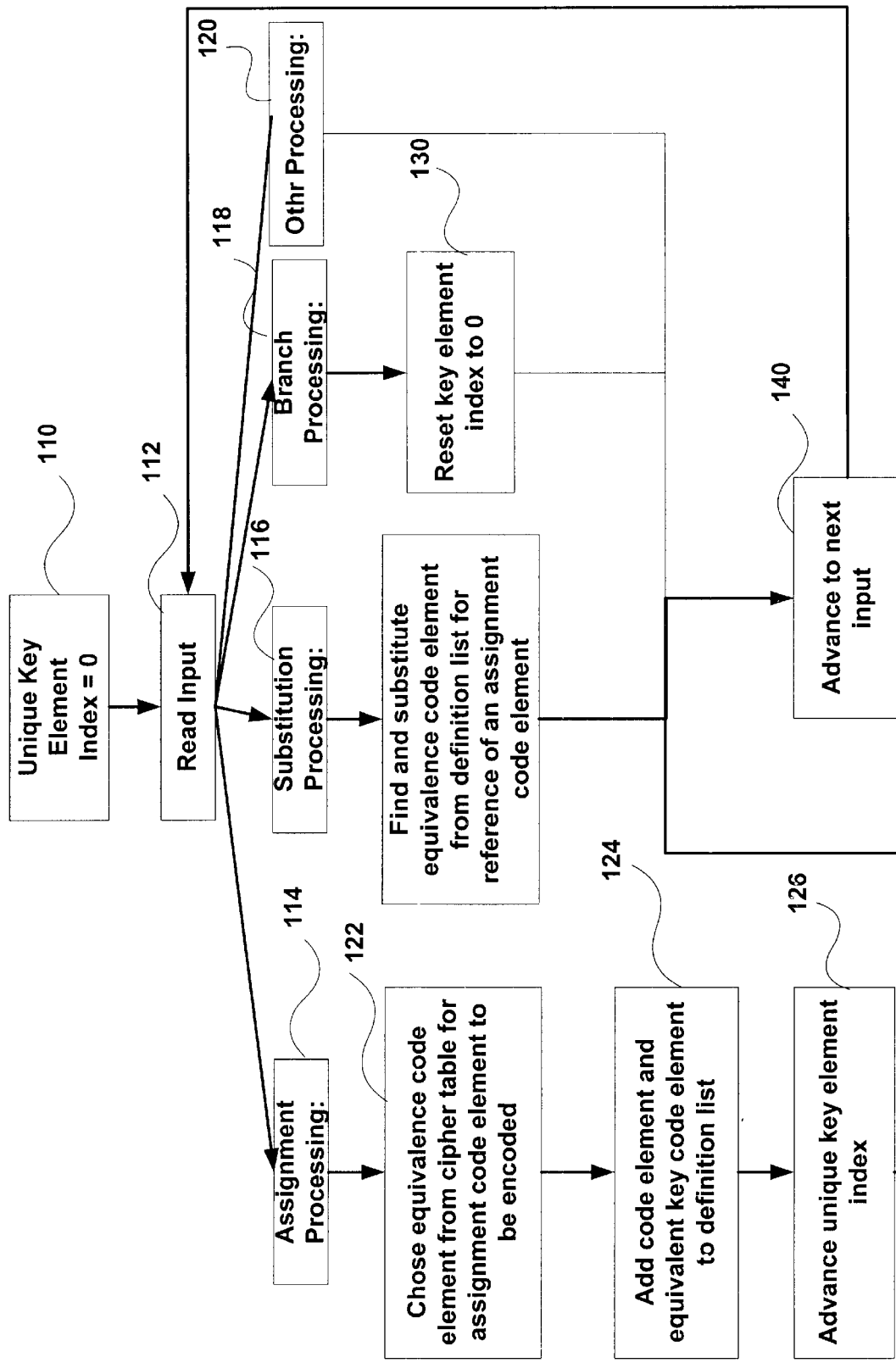
FIG. 8 is a flowchart of another embodiment of a method for encoding a machine executable program.

Referring now to FIG. 8, shown is a flowchart of an embodiment of method steps for encoding a machine executable program. It should be noted that these are more detailed steps than those generally described in conjunction with FIG. 6. The steps of FIG. 8 describe an embodiment where a unique key has been chosen. Those portions of the software to be encoded are assignment statements. Additionally, in this particular embodiment when a branch statement is encountered which branches to another segment of code, the unique key element index is reset to 0. In this description, the unique key element index identifies which element in the encoding string is current. In other words, the unique key element may identify which element in the encoding string is being used to choose an equivalence code element from the cipher table for the next element to be encoded in the machine executable program. Generally, the unique key chosen may be any type of encoding string including, for example a birth date, an employee ID, a name, word, or phrase encoded in accordance with a predetermined code, or any other type of unique key agreed to by both the encoder and the decoder.

At step 110, the unique key element index is initialized to 0. At step 112, input is read. After reading the input as in step 112, a classification as to the type of processing operation is performed. If a determination is made that an assignment statement is encountered, control proceeds to step 114 where assignment processing begins. The current element of the unique key may be identified by the unique key element index. An equivalence code element is chosen from the cipher table in accordance with the current unique key element index, as at step 122. For example, if the unique key element indicated by the unique key element index is the integer 1, the cipher table would include information for mapping the unique key element 1 to an equivalence code element, such as register 0. If, for example, the target register of an assignment statement were register 5, register 5 may be replaced with register 0 in accordance with the cipher table and current element of the unique key.

At step 124, the code element encoded and the equivalence code element are added to a definition list. The definition list in this embodiment may be used for performing substitution processing. As known to those skilled in the art, this is generally a step performed when making a textual substitution of one code element with an equivalence code element. With regard to the previously described processing at step 122, the code element register 5 was replaced with an equivalent code element of register 1. Thus, every reference to the use of this definition of register 5 must also be replaced with register 1. In other words, the processing at step 124 is used to add a definition of an equivalence of a particular code element to an equivalent list. Since an assignment statement generally provides a definition for a register, and this definition has changed. Each reference to this definition must also be modified. An example illustrating this will be described in the paragraph that follows.

At step 126, the unique key element index is advanced to the next element in the unique key element index string. It should be noted that when the unique key element index reaches the maximum or last element in the unique key, the index may be reinitialized to 0 to identify the first element in the unique key.

After processing at step 126, control proceeds to step 140 where the next input is read. Generally, step 140 causes the input stream to advance to the next element which needs to be examined in step 112. Control proceeds to step 112 where the input is read. The input read at step 112 may also be classified as requiring substitution processing, and control proceeds to step 116. Generally, a statement or input may require substitution processing if it is a reference to an element which has been added to the definition list in step 124. At step 128, if a reference to an assignment element has been determined, the equivalence code element is located from the definition list and replaced in the encoded machine executable program. In other words, the processing performed by a classification at step 116 replaces each reference to an encoded definition from step 124 with the encoded equivalence code element. Subsequently, after processing at step 128, control proceeds to step 140 where the input is again advanced and control proceeds to step 112 where the next input element is read.

If an input is classified as requiring branch processing, control proceeds to step 118. In this particular embodiment, a determination has been made to reset the unique key element index to 0 when a branch statement for example, transferring control to a different section of code is encountered. At step 130, the unique key element index is reset or reinitialized to 0. Subsequently, control proceeds to step 140 where the next input is advanced, and input is read, as in step 112.

Input may be classified as "other processing" if it does not require assigment, branch, or substitution processing. In this instance, control proceeds to step 120 where no additional action is taken other than to advance the input to the next element.

Regarding the steps previously described in conjunction with FIG. 8 with reference to elements of FIG. 6, the portion of the software encoded in step 90 of FIG. 6 was chosen to be the assignment statements. Generally, this may be chosen as an alternative to encoding all of the software, or each machine instruction included in the machine executable program. Encoding of the assignment statements provides for assurance for example, that no computer virus has contaminated the machine executable program currently being encoded. This is based on the assumption that any computer virus will at some point have to execute an assignment statement. Thus, this would cause the recognizer or decoder to not properly recognize software which has been contaminated. Generally, portions of the software selected to be encoded may vary with use and implementation.

Figure 9:
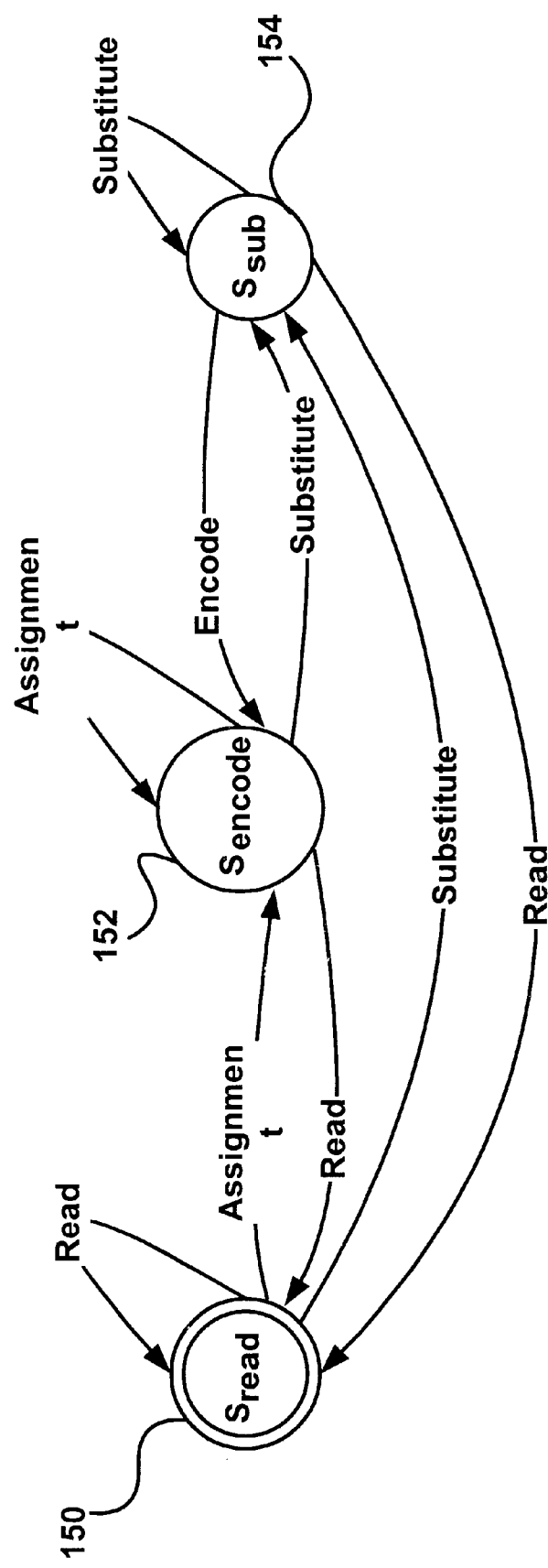
FIG. 9 depicts an embodiment of a generalized state transition diagram of an encoder.

Referring now to FIG. 9, shown in an embodiment of a generalized state diagram of the steps of an encoder generally described in FIG. 8. Generally, the state diagram depicted in FIG. 9 includes a read state 150, an encode state 152, and a substitution state 154. The read state 150 is also the start state. The state may change or advance when the next input element is read. In this particular embodiment, an input element may be one portion of the instruction, such as an op code or a register. Generally, the state diagram of FIG. 9 depicts a continuous process of reading input until an assignment processing or a substitution processing is required. Once assignment processing is detected, the state of the encoder transitions to state 152. Control may transition to the substitution state 154 where substitution processing is performed, as in step 128 of FIG. 8, replacing each reference to an encoded definition using the definition list.

It should be noted that the processing steps described in FIG. 9 as well as FIG. 8 are particular to this embodiment and may vary with other preferred embodiments of the invention while using the general concepts and guidelines described herein in accordance with principles of the invention.

Figure 10:
FIG. 10 shows an embodiment of a cipher table as used in encoding and decoding a machine executable program.

Referring now to FIG. 10, shown is an example of an embodiment of the cipher table. The cipher table of this particular embodiment includes the symbol as included in the symbol column, which may be the digits 0–9. The cipher table also includes corresponding register equivalence or equivalence code elements depicted in the right hand side of the table. Generally, the symbols '0'–'9' are those which may appear in the unique key. These elements in the unique key determine which register equivalence in the corresponding register equivalence class are used in subsequent substitutions for various assignment definitions in the machine executable being encoded.

The actual content and layout of the cipher table as depicted in FIG. 10 may vary with embodiment. In this particular embodiment the unique key includes only digits as the symbols '0'–'9'. If another preferred embodiment of the invention included other symbols, such as alphabetic characters, these would also appear in the symbol string listed on the left-hand side of FIG. 10.

The register equivalence classes each include one or more code elements. In this particular embodiment, the code elements include the registers 0 through register 29, denoted R0–R29. These denote, for this particular machine code being examined, 30 general purpose registers numbered R0–R29 respectively. In other preferred embodiments, the precise registers which may appear for example in the statements chosen to be encoded, such as assignment statements, may vary.

Also in this particular embodiment of the cipher table, three registers are in each equivalence class for a particular symbol. Other preferred embodiments of the cipher table may choose a different number of registers to be included in each register equivalence class, as well as choose different registers to be included in each particular equivalence class. Generally, the number of registers chosen in each equivalence class associated with a particular symbol is in accordance with the portions of the software to be encoded.

In choosing the number of elements included in an equivalence class associated with a particular symbol, care should be taken to include a number of elements to enable proper reuse of a register symbol. For example, if all statements with registers are being encoded rather than just assignments, each time a register was being reused for encoding, in accordance with a particular unique key element, a determination may be made as to the scope of use of a particular register being used in the encoding process. Prior to reusing register 0, for example, a determination may be made as to the scope of the references of register 0 that may be associated with a particular definition of register 0. As known to those skilled in the art, this is generally the problem of determining register scope or usage, as may be encountered by one performing various conventional optimizations known to those skilled in the art.

In the previously described embodiment of replacing only registers used in assignment statements, no determination needs to be made as to the scope of a register definition because an assignment is a redefinition. Thus, by only encoding assignment statements and registers used therein, the process is streamlined. However, other preferred embodiments may choose to encode statements other than the assignment statement. Generally, this type of embodiment may include an extra preprocessing step to determine the number of elements, such as registers, included in each equivalence class associated with a particular symbol in the unique key.

Generally, this determination of the number of elements required or needed for a particular equivalence class associated with a symbol may be determined for example, by performing a scan of the object or machine executable code prior to performing the encoding processing steps. This preprocessing may determine the lifetime of a particular register with regard to its use of definitions and references. This information may be used to determine at any point in time how many registers may be required to be used at one point without having improper reuse of a register in a particular equivalence class.

Figure 11A:
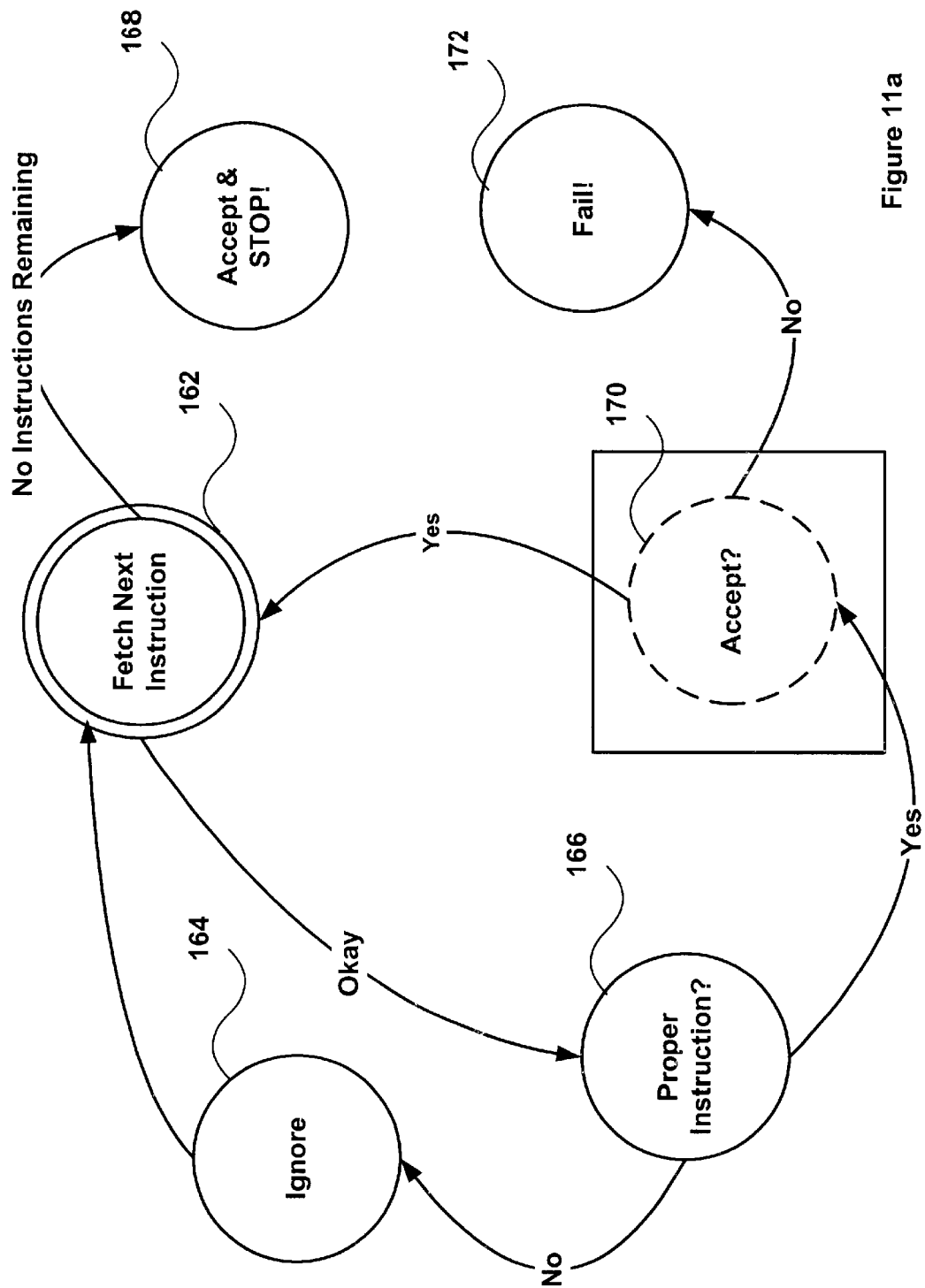
FIG. 11a depicts an embodiment of a state transition diagram for a method of decoding a machine executable program.

Referring now to FIG. 11a, shown is an example of a state transition diagram for the general process of decoding. Generally, the decoding process depicted by the state diagram of FIG. 11a includes a start state 162 in which the next instruction is fetched, an ignore state 164 a proper instruction state 166, an accept and stop state 168, an accept state 170, and a fail state 172. Control begins at start state 162 where the next instruction is fetched in the instruction stream. Once the next instruction is fetched, the state diagram transitions to state 166 where a determination is made as to whether the instruction is proper. If the instruction is proper, the diagram transitions to state 170 where a determination is made as to accept or reject the instruction. If a determination is made at state 166 that the instruction is not proper, it is subsequently ignored by transitioning the input state to 164. Subsequently the next instruction is read when the transition is made to state 162. It should be noted that a "proper" instruction is generally one which is under consideration for encoding and is thus being considered for decoding. In our previously described embodiment, the instructions being considered for encoding are those assignment statements. Thus a proper instruction in this particular embodiment refers to those which are assignment statements. Other types of statement, such as those performing a write to memory, may ignored such as by proceeding to state 164 when such an input is read. When a proper instruction is read, referring to state 166, a determination is made as to whether or not it is accepted. In determining whether or not it is accepted, the state transition diagram proceeds to state 170 where such a determination is made. If it is not accepted, a state diagram transition to state 172 where the acceptance fails and the encoded machine executable is not accepted or verified. If the instruction is proper and is accepted in state 170, transition is made to state 162 where the next instruction is subsequently read. Processing within the transition diagram continues processing input instructions until no instructions remain and no failures have occurred. At this point, the state diagram would transition to the final state 168 where the input would be accepted and processing or fetching of instructions would cease.

It should be noted that an instruction is accepted in a determination of state 170 when the next expected element of the unique key is produced through decoding by use of the cipher table and the encoded instruction stream. This decoding and the process with the use of the cipher table and the particular encoding string will become more apparent in the description of FIG. 11b in paragraphs that follow.

Figure 11B:
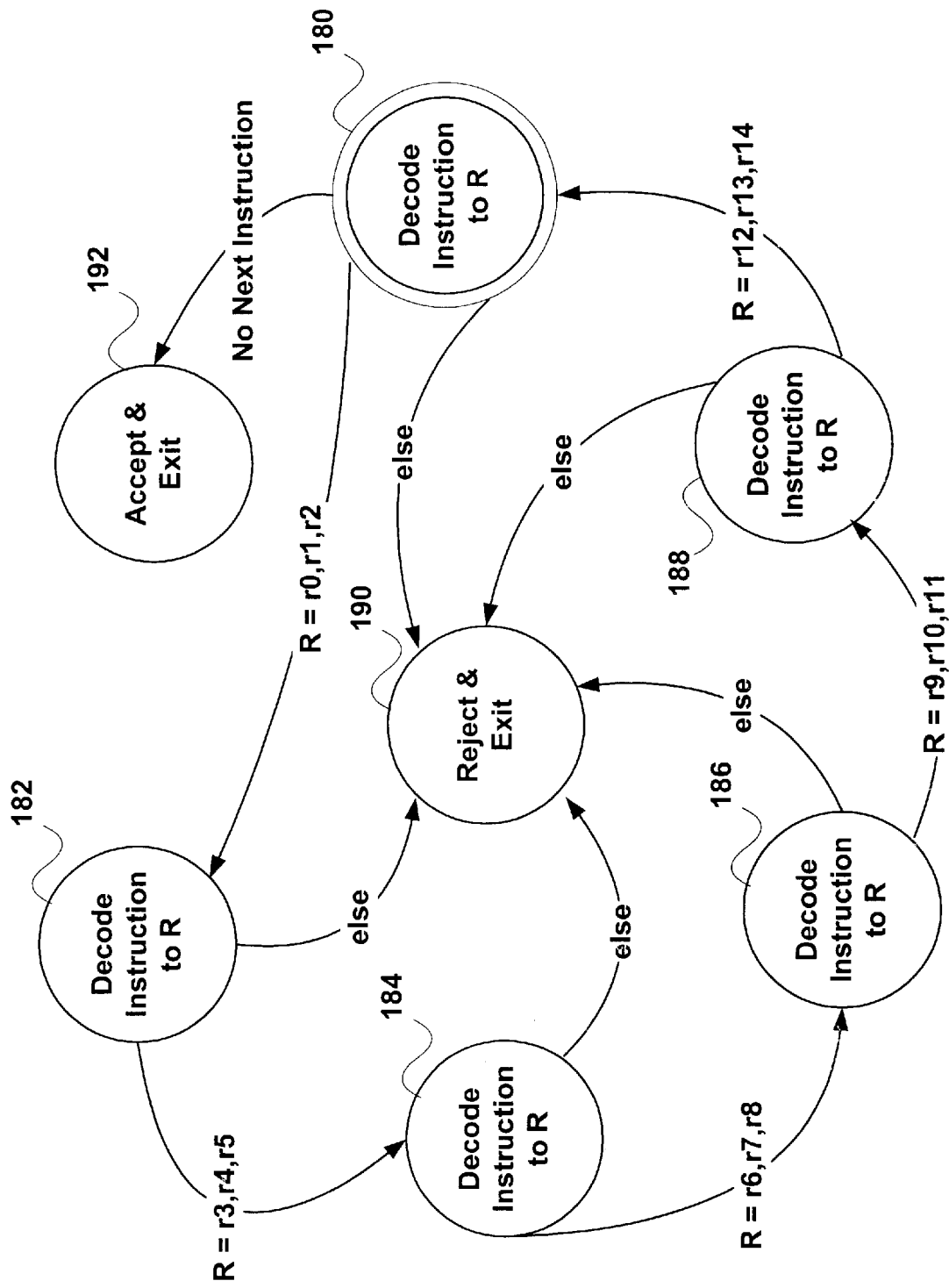
FIG. 11b depicts another embodiment of a technique for decoding a machine executable program.

Referring now to FIG. 11b, shown is a more detailed transition state diagram of a decoder for a particular embodiment. In particular, the state diagram of FIG. 11b uses the cipher table 160 of FIG. 10 with the unique key "12345". Generally, as known to those skilled in the art, the transition state diagram of FIG. 11b is known as a recognizer which either accepts or rejects a string. In this instance, in accordance with the cipher table 160 of FIG. 10 and the unique key string "12345" any string other than "12345" will be rejected by the state diagram in FIG. 11b. In FIG. 11b, the start state 180 reads an instruction register which is decoded. If the register is either 0, 1, or 2 in accordance with the equivalence class for symbol '1', as in the cipher table, the state diagram transitions to state 182. If any register other than 0, 1, or 2 is encountered, the state diagram transitions to a reject and exit state 190. From state 182, the next register encoded in an assignment statement is accepted if it is register 3, 4, or 5 in accordance with the equivalence class for symbol '2' of the cipher table 160. If register 3, 4, or 5 is encountered, the state diagram transitions to state 184 where processing of the next register element is continued. However, if a register other than 3, 4, or 5 is encountered while in state 182, the state diagram transitions to state 190 again where there is a rejection and an exit. Similarly, transitions are made between states 184, 186, 188, 190, and 192 until there is no more input, and the unique key is at an ending point. In other words, in this particular embodiment, it is assumed that only when a complete cycle through the unique key has been completed and the input has been exhausted will the encoded software properly be accepted in state 192. It should be noted that other preferred embodiments may have modified state transition diagrams for example, where a complete cycle of the unique key is not expected prior to being accepted. In other words, an encoded machine executable would be accepted if, for example, the unique key element index terminated at 3 instead of 5 for a unique key with a length of five. In the previously described embodiment with FIG. 11b, the unique key has five elements and terminates on the fifth element when no additional input is expected in order to be accepted by the recognizer of FIG. 11b.

Referring now to FIG. 12a, shown is a code segment before encoding processing. The code segment of FIG. 12a is a sequence of MIPS-like assembly instructions. Generally, FIG. 12a includes three separate portions which describe the function of code segment in FIG. 12a. The portion 200 generally includes 3 pseudo-code-like descriptive instructions 200a–200c. Section 202 includes a series of equivalent assembly-like instructions which implement the function described by the segment 200. The segment 204 includes a comment section which includes a 1—1 correspondence description for those assembly-like instructions included in segment 202. Generally, the code segment of FIG. 12a swaps two elements $V_k$ and $V_{k+1}$. A temporary element is used in doing the swapping of the code segment of FIG. 12a.

Referring now to FIG. 12b, shown in the previous code segment of FIG. 12a after the encoding process. It should generally be noted that instructions 202a–202e of FIG. 12a correspond respectively to instructions 210a–210e of FIG. 12b after the encoding process. In this particular example, the unique key to be encoded in the software is the string "01234" and the portion of code to be encoded is the assignment statements. This encoding process uses the cipher table 160 of FIG. 10. In this instance, instruction 210a is an add instruction with an assignment being done in 202a to register 2. Thus, in accordance with the decision to encode assignments, register 2 is encoded in accordance with the first element 0 of the unique key. Using the cipher table 160, and indexing to symbol 0, registers 27, 28, or 29 may be used to encode register 2. Thus, register 27 is chosen as the replacement or equivalence code element for register 2. In one particular embodiment, the registers in each equivalence class may be cycled through and reused each time in order. It should be noted that other particular embodiments may choose to have a different mapping of a particular register equivalence for a particular point in time when doing a substitution or encoding of an element of the unique key rather than merely cycle through elements. For example, a random selection process between all of the elements of a register equivalence class may be used. Another encoding scheme may be in accordance with the number of operands for a particular instruction if the number of operans vary per instruction.

Referring now to instruction 202b and instruction 210b, the 'lw' is a load word instruction, which in accordance with FIG. 12a, loads an assigned value into register 15. In accordance with the unique key "01234", the next element in the key string to be encoded is '1'. Referring to the cipher table 160 of FIG. 10, for the symbol '1', the register equivalence class includes register 0, 1, or 2. In this instance, register 2 was chosen be the encoding process and encoded in the machine executable program by substituting register 2 for register 15 in instruction 210b. Similarly, the encoding process continues for the remainder of the ins tructions in FIG. 12a. It should be noted that the first five instructions 210a–210e of FIG. 12b correspond to those instructions in FIG. 12a. It should also be noted that the instructions 210d and 210e do not include any encoding as no assignments are performed within these particular assembly instructions. However, substitution processing may be performed on register references included in these statements.

It should be noted that the code segment of FIG. 12a is considered raw code or that which is input into the optimizer prior to optimization. Thus, the code change as seen in FIG. 12b as being different from FIG. 12a include the encoding process as well as additional optimizations that may have occurred within an optimizer, or additional processing after compilation. The code of FIG. 12a for example, is the output of processing of compilation of step 70 of FIG. 5 which serves as the input to step 72 prior to optimization also of FIG. 5. The code of FIG. 12b represents a sample code segment, for example, that is the output of encoding processing as performed at step 74 of FIG. 5.

Generally, the techniques previously described have the characteristic of generally conveying additional information without changing the behavior of the machine executable program. There is additional information placed in the channel of software where someone who is not aware of the additional information cannot detect that this information is actually encoded in the software. Generally, the applications for this technique as described herein are varied and numerous. They may be used for example, in detecting and preventing the use of software viruses by performing detection prior to execution of a machine executable program. For example, if a software virus altered the encoded machine executable by inserting an assignment statement, the decoder would detect a difference in the unique key generated or recognized by the decoder. Thus, referring back to FIG. 11b for example, the decoder or recognizer may enter into the reject and exit state 190, upon detection of the invalid assignment statement which was inserted by a code virus.

The general techniques described herein may also be used to prevent software piracy as well as execution of only a particular version of software. For example, suppose version 1.0 of a product is encoded with a particular cipher table, and a first encoding string, and suppose particular predetermined portions of the machine executable program are also encoded. Version 2.0 of the software product may be encoded with a different second cipher table using a second different encoding string and encode the same or different portions of the machine executable program for version 2.0. A recognizer on a particular node, such as 20b of FIG. 1, may only allow execution of version 2.0 of a particular software. Thus, inserting a recognizer or decoder on the node for version 2.0, and only enabling loading and execution of an image when recognized by the version 2.0 decoder may accordingly disallow execution of version 1.0 or version 3.0 of the same product on that node. This may be useful, for example, when various versions of software become outdated or are invalid when combined with particular versions of other software, such as an operating system. Additionally, this may also be useful when one only wishes to execute software which may be produced by a particular vendor. This may ensure that pirated software may not be executed on a particular version of an operating system, for example, when the operating system only will execute those versions of the software which are recognized by its decoder installed in the operating system.

Generally, the techniques described herein may be used as preventive measures to safeguard against improper execution of machine executable programs. These techniques have the advantage of not requiring execution or contamination of a computer system prior to detection of the virus. Rather, as described herein, this technique may be used to detect, for example, a virus, without infecting a computer system by requiring execution in order to detect the presence of a virus. Additionally, such techniques as described herein provide an advantage of providing protection against self-mutating viruses by not relying on recognition of known viruses. In other words, as new and additional viruses come into existence, either by self-mutation or new development of new viruses, the techniques described herein may be used to prevent execution of machine executables which may be infected by these new viruses without requiring an update to any type of virus detection software on an operating system.

The techniques also described herein are desirable in that they are flexible, have no impact on performance of code, and are undetectable when examining the encoded machine executable program. Another embodiment operates on JAVA bytecode rather than a MIPS assembly-like code. In this second embodiment, the cipher table 160 as in FIG. 10 would include local variable equivalences in each of the classes associated with a particular symbol.

Thus, the techniques described herein as known to those skilled in the art may be adapted to other embodiments such as the use of JAVA by simply substituting the concepts of register equivalence with the local variables as particular to JAVA bytecode.

Generally, the techniques described for producing the variance equivalence classes which appear in the cipher table are wide and varied. For example, a preferred embodiment may determine the various contents of each equivalence class for a particular symbol appearing in a unique key by prescanning, as previously described. Other shortcuts known to those skilled in the art may be used in determining equivalence classes for the various symbols. One point in choosing the number of elements for each table is to take into consideration the number of times a pattern repeats. When substituting for a particular symbol in the unique string being encoded, there should be a sufficient number of elements in a class such that there are not more registers required than provided in a class. Other techniques, such as encoding only assignment statements described herein, work around the problem of having to determine the lifetime of a variable or register usage. Thus, by encoding assignments, a prescan is not required of the raw code, such as depicted in FIG. 12a, in determining the number of elements in each equivalence class. As previously described, this shortcut of encoding assignments generally eliminates the step of determining the lifetime or use of a register in that assignments always indicate reuse of a register.

As generally described herein, a "signature" may include a varying number of components and various types of components which are agreed upon by the encoder and the decoder. These may include the cipher table, the unique encoding key, the method of encryption used for encrypting the cipher table, and the portions of code which are actually encoded. Additionally, the encoder and decoder may have variations upon the techniques described herein, as long as the encoder and decoder both agree in terms of implementation as to what is encoded and decoded. For example, multiple cipher tables may be used in encoding one machine executable. A technique which may alternate the use of several different cipher tables may be incorporated in the encoding process. Additionally, multiple strings may similarly be used as the unique key strings encoding certain types of statements or lines of code within a particular machine executable. For example, two different encoding strings may be used where one string is used to encode even line numbers and a second string is used in encoding odd line numbers. These may be used in alternation with different cipher tables.

Generally, the techniques described herein may use a signature unique and dependent upon a particular machine executable. The techniques described herein are flexible in that any portion of a machine executable may be encoded. Additionally, the encoding processing step, such as step 74 FIG. 5 may be performed at a different point in processing other than as depicted in FIG. 5. For example, the encoding process 74 may be performed after the link step 76 of FIG. 5. Additionally, a preferred embodiment may encode various portions of a machine executable and associated libraries, for example, in "pieces". For example, a machine executable may be encoded after linking thus encoding the entire machine executable. In other words, all of the object files contributing to that machine executable may be encoded using the same techniques within a single encoder. Additionally, an embodiment may also encode in "pieces" by using a different encoding scheme for each object file. In another embodiment, the various object files which contribute to a machine executable may be encoded separately rather than encode the final linked product or machine executable. In this particular embodiment, the encoder may be considered part of the compilation process occurring prior to linking rather than after linking. Generally, the encoder may be inserted at various points in processing as just described. The general rule is that there must be secure contact points. In other words, the output of compilation which includes optimization should have no modification to the code prior to encoding. This is such that no virus, for example, may be inserted prior to encoding. Thus, a secure contact point must be made between the previously described optimization phase output and the input to encoding. The output of the optimization phase for example, must serve as the exact input to the encoding step. No modifications should be made by unsecured software between these points for the encoding and recognition and verification to work properly as described herein.

On a node which may execute an encoded machine executable, the decoder or the receiver may be located at various points depending upon each particular implementation. For example, the decoder such as that of FIG. 11*b* may be located within a security firewall. In an embodiment, machine executables may not even be located or stored on any type of storage medium within a system if coming through the Internet, for example, if the machine executables are not properly recognized by a decoder.

As previously described, the decoder may also be connected with the loader. Thus, only when machine executables are actually executed is there a recognition process In this embodiment, machine executable programs may reside on disk storage on a particular system even though they may be infected with a virus. However, the virus can generally do no "harm" in the computer system with the decoder hooked in with the loading process as described herein in that the machine executable which may be infected with a virus is never executed. Virus detection is done prior to loading and executing on a particular computer system. Other embodiments which are variations of the previously described techniques may include, for example, encoding a unique key identifier or encoding string with a cipher table and sending the unique key identifier as part of a message or other data communicated to a computer system which executes the encoded machine executable.

In the JAVA implementation of the techniques described herein, the stack machine may used with local variables rather than the registers in the previously described technique. In the JAVA application, a preinterpretive or precompiler verifier is added. In particular, this function may be added to the existing JAVA verifier.

The previously described techniques are flexible in that all or portions of the incoming executable may be recognized. A variety of different encoding schemes may be used. Thus, the large number of different combinations of encoding schemes possible given all of the components of each particular signature and how they may be used and varied, makes the use of the foregoing techniques desirable in that one is unable to detect or practically decode through trial execution the different encoding schemes that may be used herein. Additional benefits include the fact that the foregoing techniques work on single systems or in a distributed system. The foregoing techniques work on JAVA/JIT systems as well as in the traditional compiler scheme.

The actions which may be taken when a particular piece of software is "rejected" is varied. For example, one may choose to still run or execute the software at risk even though the software has been rejected, as in the processing of the state diagram of FIG. 11*b* state 190. The foregoing techniques may be easily implemented for example, by one using a commercial grade compiler and adding the encoding process as a functional component after optimization as described. Similarly, as previously described, the function and the techniques may be easily adaptable for use in a JAVA or JAVA/JIT system as known to those skilled in the art.

It should be also noted that, referring to the ignore state 164 of FIG. 11A, when an instruction is deemed not proper, this instruction may be ignored. However, other preferred embodiments may choose not to ignore the instruction and evaluate the instruction in some way to supplement the capabilities of the recognition techniques.

Having described preferred embodiments of the invention, it will now become apparent to those of skill in the art that other embodiments incorporating its concepts may be provided. It is felt, therefore, that this invention should not be limited to the disclosed embodiments, but rather should be limited only by the spirit and scope of the appended claims.

What is claimed is:

1. A method executed in a computer system for encoding machine executable programs, the method comprising:

generating a machine executable program;

choosing a unique key to encode the machine executable software;

producing a cipher table in accordance with elements of the unique key and the machine executable program;

determining portions of the machine executable program to be encoded;

encoding portions of the machine executable program to produce an encoded machine executable program;

decoding said encoded machine executable program prior to execution;

infecting a second machine executable program with a computer virus;

detecting, prior to execution of said second machine executable, that said second machine executable is not said encoded machine executable; and upon detecting that said second machine executable is not said encoded machine executable, taking appropriate actions.

2. The method of claim 1, wherein the cipher table includes local variable equivalence classes, and the encoded machine executable is a machine executable that includes JAVA bytecode.

3. The method of claim 2, wherein the step of decoding is performed by a precompiler verifier included in a JAVA verifier.

4. The method of claim 1, wherein said encoding step and said decoding step detect a computer virus.

5. The method of claim 1, wherein a second cipher table is used in said encoding and said decoding steps.

6. The method of claim 1, wherein said decoding step is executed prior to loading said second machine executable into memory.

7. A method executed in a computer system for encoding machine executable programs, the method comprising:

generating a machine executable program;

choosing a unique key to encode the machine executable software;

producing a cipher table in accordance with elements of the unique key and the machine executable program, wherein said cipher table includes a register equivalence class for each unique symbol included in said unique key;

determining portions of the machine executable program to be encoded;

encoding portions of the machine executable program to produce an encoded machine executable program; and decoding said encoded machine executable program prior to execution.

8. A method executed in a computer system for encoding machine executable programs, the method comprising:

generating a machine executable program;

choosing a unique key to encode the machine executable software;

producing a cipher table in accordance with elements of the unique key and the machine executable program;

determining portions of the machine executable program to be encoded;

encoding portions of the machine executable program to produce an encoded machine executable program; and decoding said encoded machine executable program prior to execution;

wherein the encoding step and the decoding step permit execution of software having a particular signature wherein the signature includes the use of the cipher table, encoding the predetermined portions of a machine executable program, and the unique key used in combination to encode the machine executable program.

9. A method executed in a computer system for encoding software comprising:

compiling a machine executable program;

optimizing said machine executable program;

encoding a portion of said machine executable program in accordance with a cipher table and an encoding string; and linking, following said encoding step, said machine executable program.

10. A method for encoding a machine executable program comprising:

compiling said machine executable program;

optimizing said machine executable program;

linking said machine executable program;

and encoding, following said linking step, a portion of said machine executable program in accordance with a cipher table, and an encoding string.

11. A method of decoding an encoded machine executable program comprising:

decoding said encoded machine executable program using a cipher table, an encoding string, and a recognizer which recognizes proper statements, said proper statements being predetermined statements which have been previously encoded and included in said encoded machine executable;

loading said encoded machine executable program into memory; and executing said encoded machine executable program.

12. A method for encoding a machine executable program comprising:

providing an encoding string;

providing an encoding policy for determining which portions of the machine executable program are encoded;

providing a cipher table including one or more equivalence classes in which each of said equivalence classes includes a predetermined number of elements in accordance with said encoding string, said encoding policy, and said machine executable program; and encoding a portion of said machine executable program in accordance with said cipher table, said encoding policy, and said encoding string.

13. A method of decoding an encoded machine executable program comprising:

providing an encoding string;

providing an encoding policy for determining which portions of the machine executable program are encoded;

providing a cipher table including one or more equivalence classes in which each of said equivalence classes includes a predetermined number of elements in accordance with said encoding string, said encoding policy, and said machine executable program;

decoding said machine executable program using said cipher table, said encoding string, said encoding policy, and a recognizer which recognizes proper statements, said proper statements being predetermined statements which have been previously encoded and included in said machine executable program.

14. An apparatus for encoding machine executable programs comprising:

machine instructions for generating a machine executable program;

machine instructions for choosing a unique key to encode the machine executable software;

machine instructions for producing a cipher table in accordance with elements of the unique key and the machine executable program;

machine instructions for determining portions of the machine executable program to be encoded;

machine instructions for encoding portions of the machine executable program to produce an encoded machine executable program;

machine instructions for decoding said encoded machine executable program prior to execution;

machine instructions for infecting a second machine executable program with a computer virus;

machine instructions for detecting, prior to execution of said second machine executable, that said second machine executable is not said encoded machine executable; and machine instructions for taking appropriate actions upon detecting that said second machine executable is not said encoded machine executable.

15. The apparatus of claim 14, wherein said cipher table includes a register equivalence class for each unique symbol included in said unique key.

16. The apparatus of claim 14, wherein the cipher table includes local variable equivalence classes, and the encoded machine executable is a machine executable that includes JAVA bytecode.

17. The apparatus of claim 16, wherein the machine instructions for decoding are included in precompiler verifier of a JAVA verifier.

18. The apparatus of claim 14, wherein said machine instructions for encoding and said machine instructions for decoding detect a computer virus.

19. The apparatus of claim 14, wherein a second cipher table is used by said machine instructions for encoding and said machine instructions for decoding.

20. The apparatus of claim 14, wherein said machine instructions for decoding are executed prior to loading said second machine executable into memory.

21. An apparatus for encoding machine executable programs comprising:

machine instructions for generating a machine executable program;

machine instructions for choosing a unique key to encode the machine executable software;

machine instructions for producing a cipher table in accordance with elements of the unique key and the machine executable program;

machine instructions for determining portions of the machine executable program to be encoded;

machine instructions for encoding portions of the machine executable program to produce an encoded machine executable program; and machine instructions for decoding said encoded machine executable program prior to execution;

wherein said machine instructions for encoding and said machine instructions for decoding permit execution of software having a particular signature wherein the signature includes the use of the cipher table, encoding the predetermined portions of a machine executable program, and the unique key used in combination to encode the machine executable program.

22. An apparatus for encoding software comprising:

machine instructions for compiling a machine executable program;

machine instructions for optimizing said machine executable program;

machine instructions for encoding a portion of said machine executable program in accordance with a cipher table and an encoding string; and machine instructions for linking, coupled to said machine instructions for encoding, said machine executable program.

23. An apparatus for encoding a machine executable program comprising:

machine instructions for compiling said machine executable program;

machine instructions for optimizing said machine executable program;

machine instructions for linking said machine executable program;

and machine instructions for encoding, coupled to said machine instructions for linking, a portion of said machine executable program in accordance with a cipher table, and an encoding string.

24. An apparatus for encoding a machine executable program comprising:

machine instructions for providing an encoding string;

machine instructions for providing an encoding policy for determining which portions of the machine executable program are encoded;

machine instructions for providing a cipher table including one or more equivalence classes in which each of said equivalence classes includes a predetermined number of elements in accordance with said encoding string, said encoding policy, and said machine executable program; and machine instructions for encoding a portion of said machine executable program in accordance with said cipher table, said encoding policy, and said encoding string.

25. An apparatus for decoding an encoded machine executable program comprising:

machine instructions for providing an encoding string;

machine instructions for providing an encoding policy for determining which portions of the machine executable program are encoded;

machine instructions for providing a cipher table including one or more equivalence classes in which each of said equivalence classes includes a predetermined number of elements in accordance with said encoding string, said encoding policy, and said machine executable program;

machine instructions for decoding said machine executable program using said cipher table, said encoding string, said encoding policy, and a recognizer which recognizes proper statements, said proper statements being predetermined statements which have been previously encoded and included in said machine executable program.

* * * * *